United States Patent
Nesbitt

(10) Patent No.: US 7,509,972 B2
(45) Date of Patent: Mar. 31, 2009

(54) PNEUMATIC VALVE WITH LOCKOUT

(75) Inventor: Harry Clayton Nesbitt, Benicia, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 556 days.

(21) Appl. No.: 11/175,152

(22) Filed: Jul. 7, 2005

(65) Prior Publication Data

US 2007/0006922 A1    Jan. 11, 2007

(51) Int. Cl.
*F16K 35/10* (2006.01)
*F16K 35/02* (2006.01)

(52) U.S. Cl. .......................... 137/383; 251/14; 251/12; 251/63.5

(58) Field of Classification Search ............... 137/383, 137/270; 251/96–100, 12, 14, 63.5, 62
See application file for complete search history.

(56) References Cited

U.S. PATENT DOCUMENTS

| | | | | |
|---|---|---|---|---|
| 2,095,622 A | * | 10/1937 | Wilson | 222/321.6 |
| 3,006,596 A | * | 10/1961 | Nelson | 251/33 |
| 3,016,062 A | * | 1/1962 | Zinniger | 137/270 |
| 3,422,996 A | * | 1/1969 | Lipman | 222/402.11 |
| 3,448,762 A | * | 6/1969 | Schmitt | 137/383 |
| 3,477,687 A | * | 11/1969 | Doutt | 251/100 |
| 3,504,694 A | * | 4/1970 | Co Woodford MFG et al. | 137/303 |
| 3,516,432 A | * | 6/1970 | Preising | 137/329.02 |
| 4,706,909 A | | 11/1987 | Cuevas et al. | |
| 4,946,130 A | * | 8/1990 | Kooiman | 251/95 |
| 5,161,568 A | * | 11/1992 | Turvey | 137/383 |
| 5,299,597 A | * | 4/1994 | Fort et al. | 137/385 |
| 5,411,115 A | * | 5/1995 | Shropshire | 184/1.5 |
| 5,433,410 A | * | 7/1995 | Foltz | 251/100 |
| 6,041,813 A | * | 3/2000 | Koch et al. | 137/383 |
| 6,463,955 B2 | | 10/2002 | Hasak et al. | |
| 6,612,538 B2 | * | 9/2003 | Fukano et al. | 251/63.5 |
| 6,896,239 B1 | * | 5/2005 | Brenes | 251/92 |
| 7,083,157 B2 | * | 8/2006 | Kingsford et al. | 251/109 |
| 7,216,667 B2 | * | 5/2007 | Igarashi | 137/383 |
| 2003/0025094 A1 | * | 2/2003 | Jones et al. | 251/14 |
| 2003/0034468 A1 | * | 2/2003 | Yie | 251/77 |
| 2005/0000570 A1 | | 1/2005 | Mohammed et al. | |
| 2006/0289818 A1 | * | 12/2006 | Hodel et al. | 251/100 |

* cited by examiner

*Primary Examiner*—John Rivell
*Assistant Examiner*—Cloud K Lee
(74) *Attorney, Agent, or Firm*—Antonelli, Terry, Stout & Kraus, LLP.

(57) ABSTRACT

A pneumatic valve with lockout for controlling the flow of a fluid includes a housing, a fluid flow passage extending through the housing between a fluid inlet and a fluid outlet, and a valve movable along an axis to open and close the flow passage. A pneumatic actuator is operable to move the valve to open and close the flow passage. A manual lockout device is actuable to selectively enable and disable the valve. The device includes a locking member movable to prevent actuation of the lockout device when the valve is disabled. A fitting on the housing to convey a pressurized gas to the pneumatic actuator is mounted to swivel about the housing for connection to an air source on any radial within 360°. The valve is compact, simple to connect in a system and safe.

22 Claims, 8 Drawing Sheets

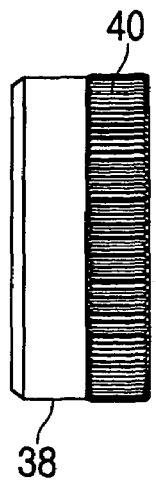
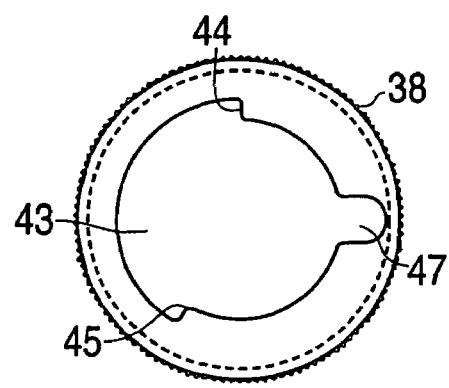
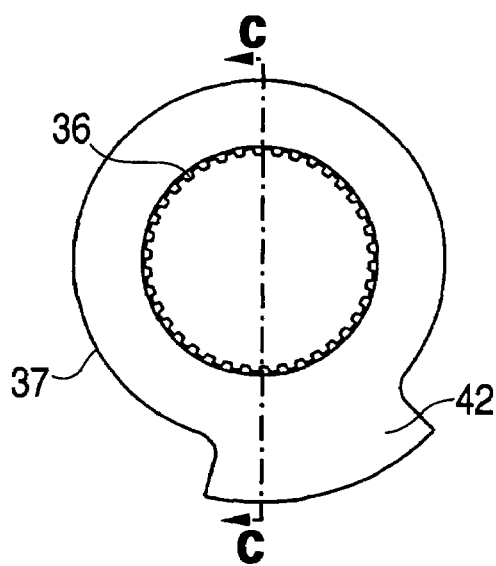
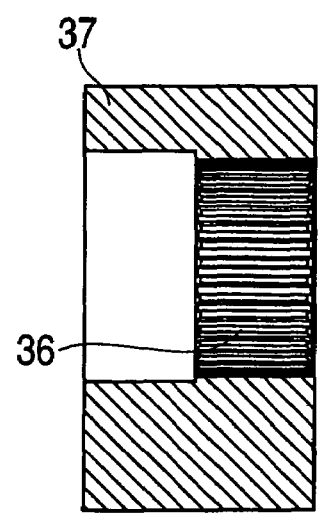
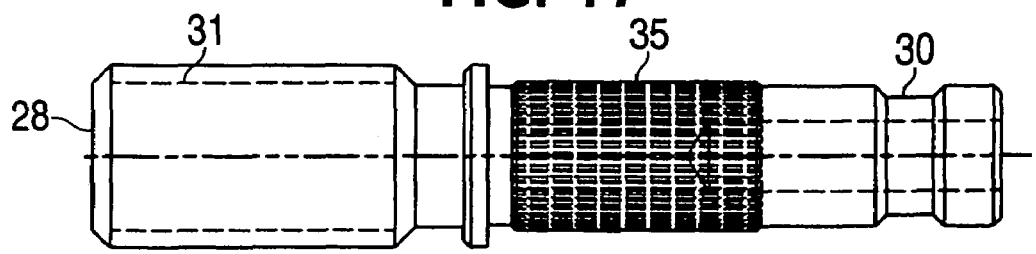

PNEUMATIC VALVE WITH LOCKOUT

TECHNICAL FIELD

The present invention relates to a combination manual/pneumatic valve and, more particularly, to a pneumatic valve with a manual lockout for controlling the flow of a fluid such as a process gas used in manufacturing semiconductors.

BACKGROUND

Manually operated valves that have incorporated a lockout/tagout (LOTO) device are known. Two examples of these known valves are designated by reference numerals 1 and 2 in FIGS. 1 and 2 of the drawings. Another example of a manual valve with lockout is disclosed in U.S. Pat. No. 6,463,955 B1.

A pneumatically operated cylinder valve capable of receiving a separate threaded plug for lockout after removing a handwheel of the valve used for valve actuation, is disclosed in U.S. Pat. No. 4,706,909. The valve is not compact enough to fit within a standard cylinder cap, necessitating removal of the handwheel for transport as well as for use of the threaded plug for lockout.

More recently, in published patent application U.S. 2005/570 A1, a combination manual/pneumatic shutoff valve is disclosed wherein a pneumatic valve incorporates an additional manually operated lockout formed with valves for pressurizing and venting the expansion chamber of the pneumatic actuator. Space must be provided for these valves as well as for the air lines and plumbing connected to the valve for pressurizing and venting the pneumatic actuator of the valve. Safety is also a concern with this known shutoff valve as the manual lockout valve for pressurizing could develop a leak, which would pressurize the actuator of the pneumatic valve and open the valve. There is a need for an improved pneumatic valve with lockout which is compact, safe and easy to install.

SUMMARY

The present invention addresses the aforementioned need. The invention is an improved combination manual/pneumatic valve, and more particularly, a pneumatic valve with lockout, for fluid control, which is more compact, easier to install and safe. The pneumatic valve in a disclosed, preferred embodiment comprises a housing, a fluid flow passage extending through the housing between a fluid inlet and a fluid outlet, a valve movable along an axis to open and close the flow passage, and a pneumatic actuator operable to move the valve to open and close the flow passage. A manual lockout device of the pneumatic valve is rotatable relative to the housing between a position to enable the valve and a position to disable the valve. The device includes a locking member which is manually movable to a position preventing rotation of the lockout device when the lockout device is in the position to disable the valve. A fitting on the housing conveys a pressurized control gas, typically air, to and from the pneumatic actuator for respectively pressurizing and venting the actuator independently of the position of the manual lockout device. The fitting is mounted on the housing for rotation around the axis relative to the housing. In the disclosed embodiment the fitting is mounted on the housing by way of a collar which extends around and is rotatably connected to the housing to allow connection to a source of pressurized control gas on any radial within 360°.

The manual lockout device of the pneumatic valve includes a knob which is rotatable relative to the house between a position to enable the valve and a position to disable the valve. The locking member is mounted in the knob for movement to and from the housing when the knob is in the position to disable the valve to respectively prevent and permit rotation of the knob relative to the housing. A hole for a locking device such as a padlock or cable is provided in the knob. The hole is exposed with movement of the locking member to the housing to allow the padlock, cable or other locking device to be inserted through the hole to preclude movement of the locking member from the housing. A pair of control pins protrude from the locking member in opposite directions through openings in the knob to permit manual movement of the locking member. A spring in the knob yieldably biases the locking member for movement from the housing. As a result of these several features of the invention, the pneumatic valve with lockout of the present invention is very compact and easy to install and use, yet safe.

These and other features and advantages of the present invention will become more apparent from the following detailed description of a preferred embodiment of the invention taken with the accompanying drawings.

BRIEF DESCRIPTION OF DRAWINGS

FIG. 13 is a side view of a lockout stop which is mounted within the actuator cap in the pneumatic valve of FIG. 3.

FIG. 14 is an end view of the lockout stop from the right side of FIG. 13.

FIG. 15 is a top view of a stop which is mounted on the stem in the pneumatic valve of FIG. 3, the stem with stop being rotatable within the lockout stop of FIGS. 13 and 14 in the assembled pneumatic valve of FIG. 3.

FIG. 16 is a cross sectional view of the stop of FIG. 15 taken along the line C-C.

FIG. 17 is a side view of the stem of the lockout in the pneumatic valve of FIG. 3.

DETAILED DESCRIPTION

Figure 6:
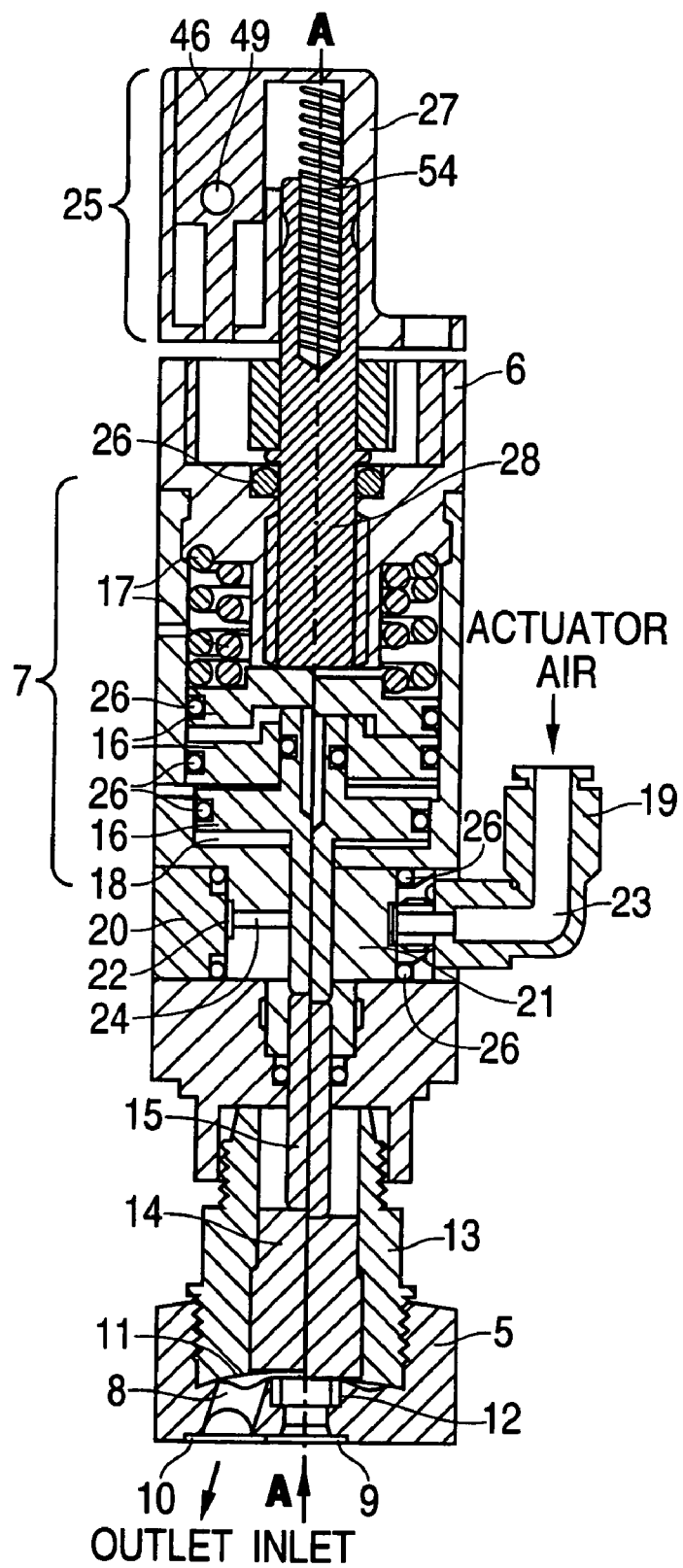
FIG. 6 is a cross sectional view of the valve of FIG. 3 through a central longitudinal axis A-A of the valve and showing the valve in operation as a pneumatic actuated valve with the lockout knob in the enabled position, the left half of the drawing showing the valve in the open position and the right half showing the valve in the closed position.
Figure 7:
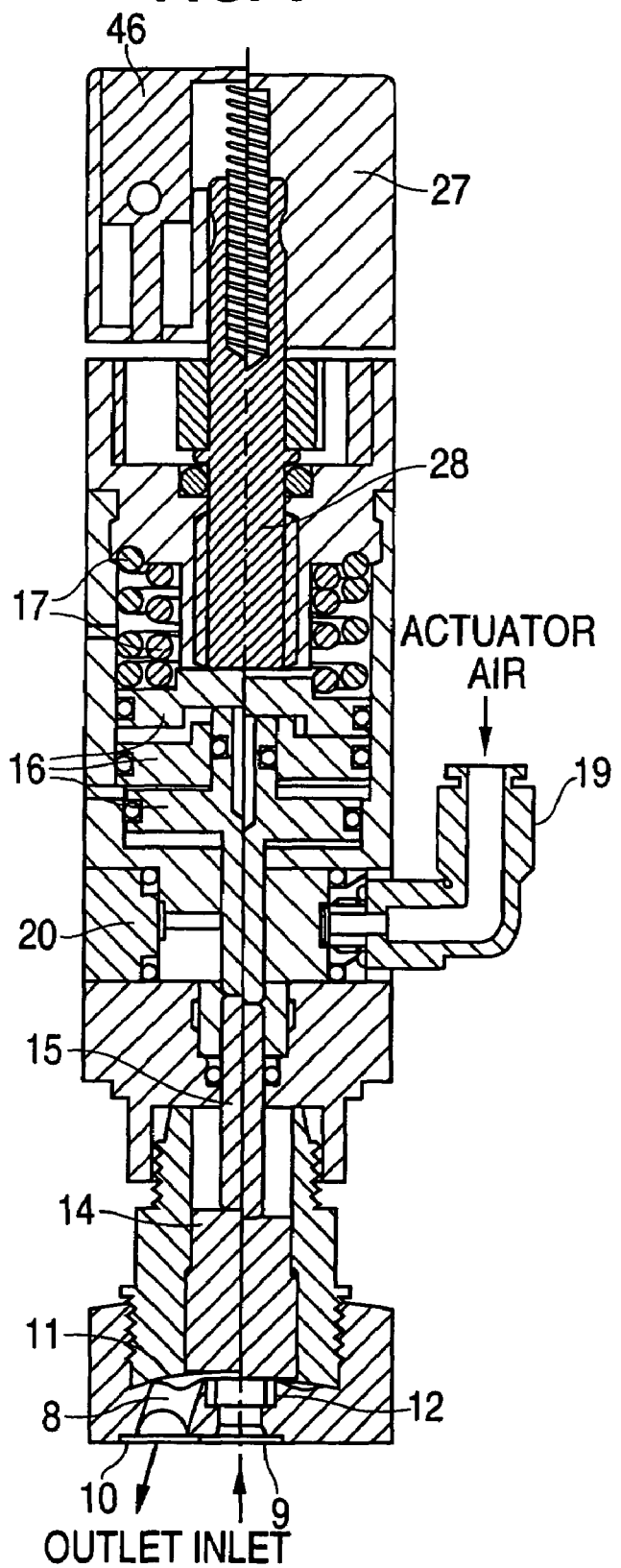
FIG. 7 is a cross sectional view like FIG. 6 but showing the valve in operation as a manual lock out/tag out valve, the left half of the drawing showing the valve in the enabled position and the right half of the drawing showing the valve in the disabled position.

Referring now to FIGS. 3-17 of the drawings, a pneumatic valve 3 with lockout for controlling the flow of a fluid, gas or liquid, is seen to comprise a housing 4 which is formed at one end by a surface mount body 5 and at the opposite end by an actuator cap 6 of an internal pneumatic actuator 7. A fluid flow passage 8 for the fluid to be controlled extends through the housing between a fluid inlet 9 and a fluid outlet 10, see FIGS. 6 and 7. A valve 11 in the form of a flexible metal diaphragm is movable at its central portion along the central, longitudinal axis A-A of the pneumatic valve with respect to a valve seat 12 located about the flow passage to open and close the flow passage. The outer periphery of the diaphragm is sealingly clamped between the surface mount body and an adjacent annular portion 13 of the housing attached by screw threads to the surface mount body. A button 14 is axially movable within portion 13 between the diaphragm and the lower end of a piston pin 15. The upper end of the piston pin is in turn engaged by the lower end of one of three pistons 16 of the pneumatic actuator. The pistons are biased downwardly as shown in FIGS. 6 and 7 by two springs 17 located between the upper piston and the lower end of the actuator cap.

A pressurized control gas, such as air, for operating the pneumatic actuator to open the valve is supplied to an expansion chamber 18 below the lower piston by way of a fitting 19 on the housing. The fitting 19 is mounted on the housing for rotation around the axis A-A relative to the housing by a way of a collar 20 that extends around and is rotatably connected to the outer surface of a housing portion 21. The outer surface of portion 21 has an annular channel 22 for the flow of gas received through a fitting passage 23. A plurality of circumferentially spaced, radially directed holes 24 through the portion 21 and a clearance between the outer surface of a depending stem on the lower piston and the surrounding surface of portion 21 permit ingress and egress of the pressurized air for pressurizing and venting the pneumatic actuator through the single air fitting. No valving of the pressurized air takes place within the pneumatic valve itself, but is done externally as part of the actuator air source, not shown. Thus, the actuator can be pressurized or vented independently of the position and movement of a manual lockout device 25 of the pneumatic valve as discussed below. O-rings 26 seal the collar 20 to the housing portion 21 while permitting relative rotation or swiveling of the collar and fitting about the axis A-A of the pneumatic valve.

Figure 1:
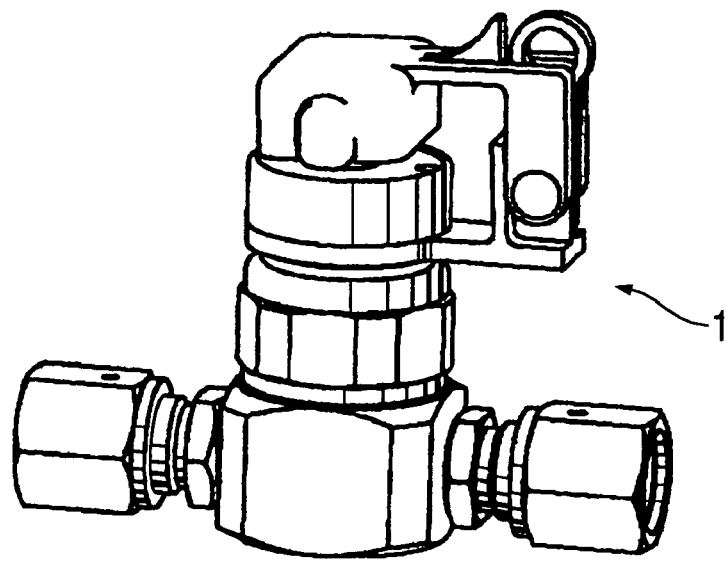
FIG. 1 is a perspective view from the side of a known manually operated valve with an incorporated lockout/tagout (LOTO) safety device.
Figure 2:
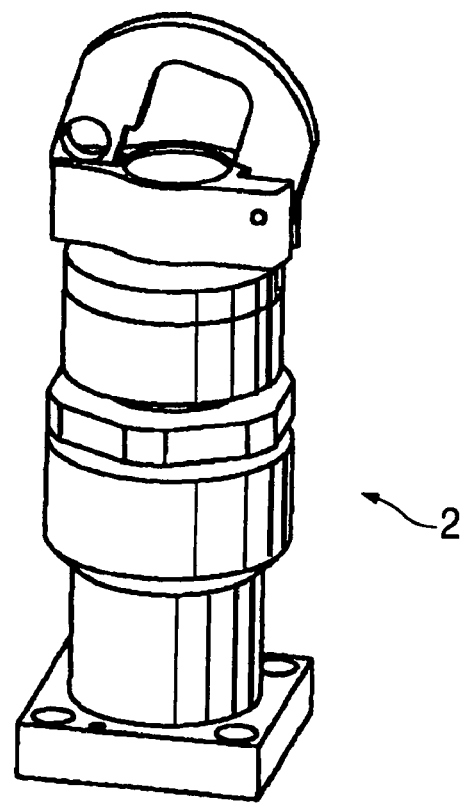
FIG. 2 is a perspective view from one side of another known manually operated valve with an incorporated LOTO device.
Figure 3:
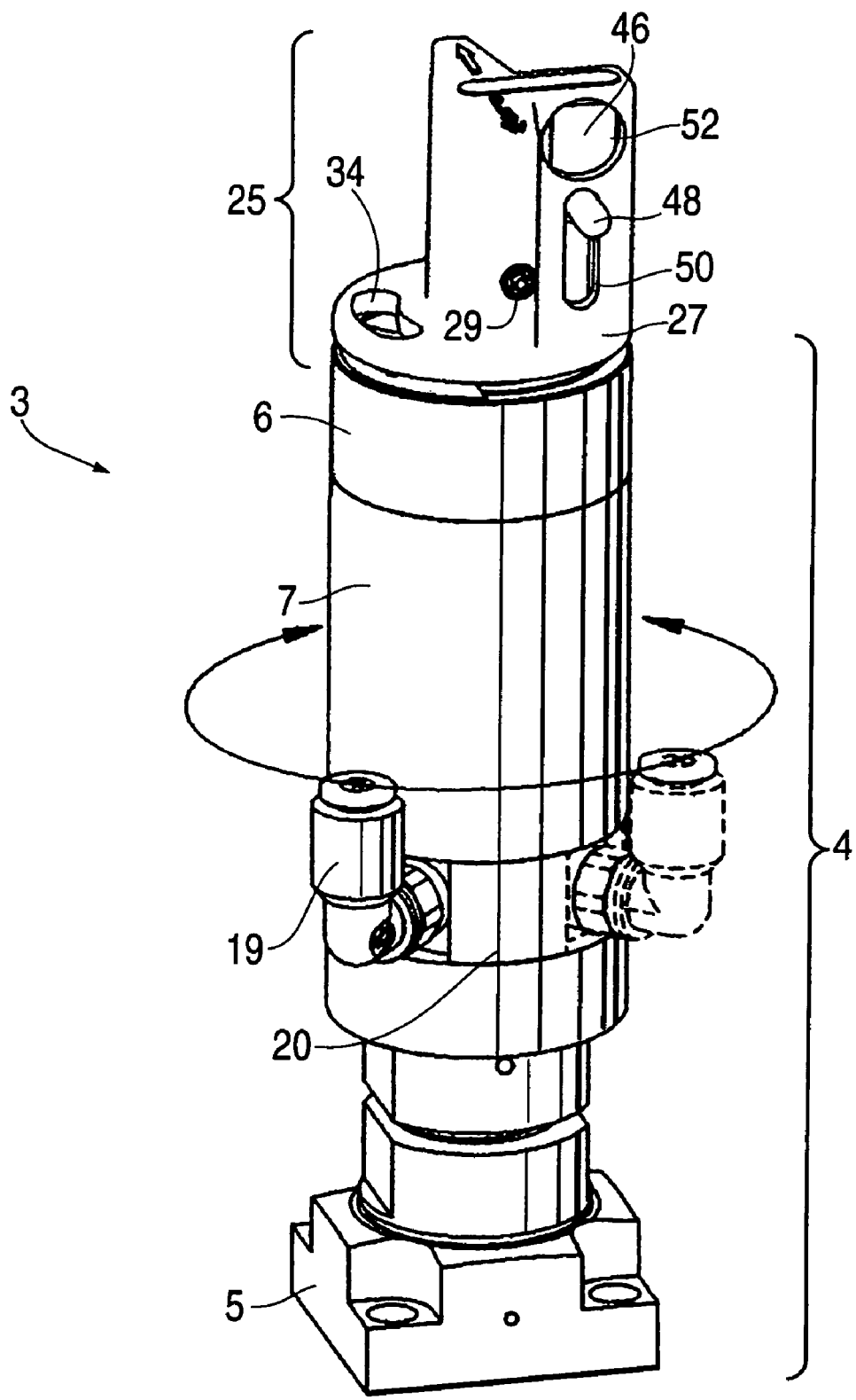
FIG. 3 is a perspective view of a pneumatic valve with lockout according to an example embodiment of the present invention.
Figure 4:
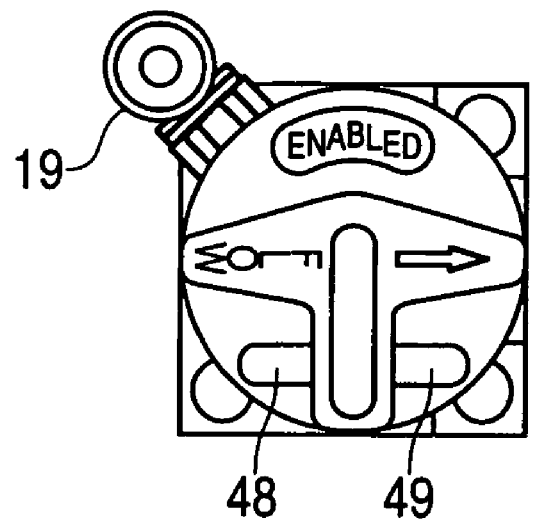
FIG. 4 is a top view of the valve of FIG. 3 showing the lockout knob on the valve rotated to the enabled position.
Figure 5:
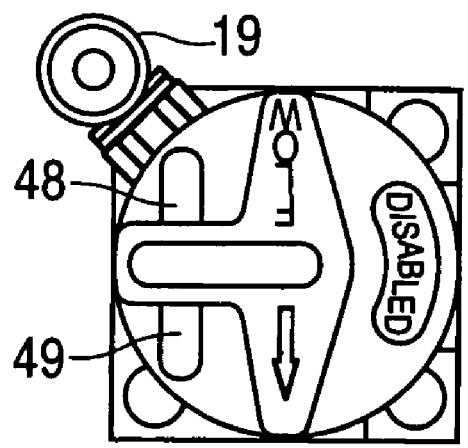
FIG. 5 is another top view like that in FIG. 4 but showing the lockout knob on the valve rotated to the disabled position.

The manual lockout device 25 includes a knob 27 non-rotatably mounted on a stem 28 by a set screw 29 shown in FIG. 3 in the knob. The inner end of the set screw firmly engages the bottom of a channel 30, FIG. 17, in the upper end of the stem. The lower end of the stem has screw threads, denoted generally at 31 in FIG. 17, formed thereon which are rotatably positioned within cooperating threads 32 in a central hole 33, FIG. 12, in the actuator cap to permit rotation of the knob relative to the valve housing and the resultant axial translation of the stem in the actuator cap. The lower end of the stem contacts the upper surface of the uppermost piston of the pneumatic actuator. Accordingly, rotation of the knob, clockwise in the embodiment, results in downward translation of the stem which is effective through the pneumatic actuator to move the diaphragm to the valve seat and close the fluid passage 8 through the pneumatic valve. This manual closure of the valve is accomplished when the knob is rotated to the disabled position, FIG. 5, where the word DISABLED on the top of the housing appears through a cutout 34 in the knob.

The middle of the stem is formed with splines 35 which engage cooperating splines 36 on the internal diameter of a stop 37 mounted on the stem for rotation therewith. A cooperating lockout stop 38 is affixed in an annular recess 39 in the end of the actuator cap by cooperating splines 40 and 41. A tooth 42 on the stop 37 is rotatable within a circumferential cutout 43 of the lockout stop over an angle of 90° before being stopped from further rotation by the shoulders 44 and 45 of the lockout stop. The ends of this permissible 90° of rotation of the knob and stem relative to the housing correspond to the enabled and disabled positions of the knob shown in FIGS. 4 and 5. The angle of rotation of course could be other than 90°, for example 180°, by changing the extent of the circumferential cutout 43 in the lockout stop.

Figure 8:
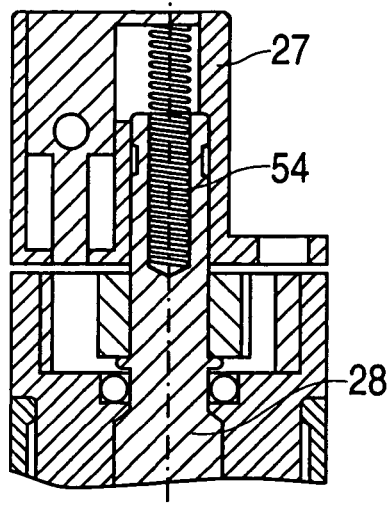
FIG. 8 is a cross sectional view through the center longitudinal axis A-A of the valve of FIG. 3 showing the locking member in the lockout knob in its upper position to permit rotation of the knob between the enabled and disabled positions.
Figure 9:
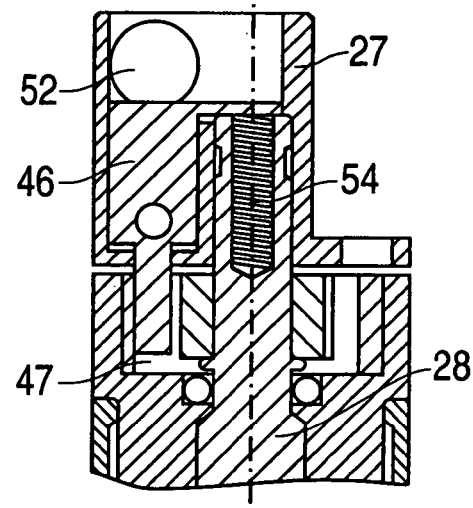
FIG. 9 is a cross sectional view like that in FIG. 8 but showing the locking member in its lower position wherein the lower end of the locking member is received in an aperture in the valve housing/actuator cap of the housing to prevent rotation of the lockout knob from the disabled position and wherein a hole in the knob for a padlock or cable has been exposed by the lowering of the locking member.

The knob is provided with a locking member 46 in a complimentarily shaped opening in the knob. The locking member is manually slidable in the knob in a direction parallel to the axis A-A toward the housing of the pneumatic valve. When the knob is in the disabled position the lower end of the locking member is in alignment with and will be received in an aperture 47 in the lockout stop, see FIG. 14, to prevent rotation of the knob relative to the housing from the disabled position. The locking member has control pins 48 and 49 on opposite sides thereof. The control pins extend out of slots 50 and 51 in the knob so that the operator can grasp the pins and manually slide the locking member into the position shown in FIG. 9 to prevent rotation of the knob from the disabled position. When the locking member is moved toward the housing, a hole 52 for a padlock, cable or other locking device is exposed. Insertion of a padlock, 53 in FIG. 10, cable or other locking device in the hole will prevent the locking member from returning to its initial position within the knob, FIG. 8, under the bias of a spring 54. The spring is supported in a recess in the upper end of the stem and acts against the locking member as shown in FIGS. 8 and 9.

The pneumatic valve with lockout of the invention can be used by mounting the surface mount body 5 of the pneumatic valve on a gas manifold with the fluid inlet 9 and fluid outlet 10 of the valve in communication with a passage for a fluid whose flow is to be controlled by the valve. In such an arrangement, the pneumatic valve with lockout of the invention may be closely positioned to adjacent components of an assembly of components on the manifold for controlling the flow of a process gas for manufacturing semiconductors, for example: A pressurized control gas, air, is applied to the fitting 19 on the collar 20. The pressurized air moves the three actuator pistons 16 upwardly within the pneumatic valve. As the pistons move up, the metal diaphragm 11 becomes unrestrained and pushes on the button 14 with sufficient force to lift the button and diaphragm off of the seat 12 until the fluid flow passage 8 is fully open, as shown in the left side of FIG. 6.

When pressurized air to the fitting 19 is removed, the two compression springs 17 push down on the actuator pistons toward the seat. The lower piston via the piston pin 15 contacts the diaphragm button 14 which contacts and deflects the domed diaphragm toward the seat. When the diaphragm contacts the seat with sufficient force, the flow path is sealed as shown in the right side of FIG. 6.

In operation as a manual lockout/tagout valve, when the knob 27 is rotated clockwise from the enabled position shown in the left half of FIG. 7, the threaded stem 28 moves toward the valve seat. The lower end of the stem contacts and pushes on the actuator pistons and button, which deflects the domed diaphragm toward the seat. When the diaphragm contacts the seat with sufficient force, the flow path is sealed.

Figure 10:
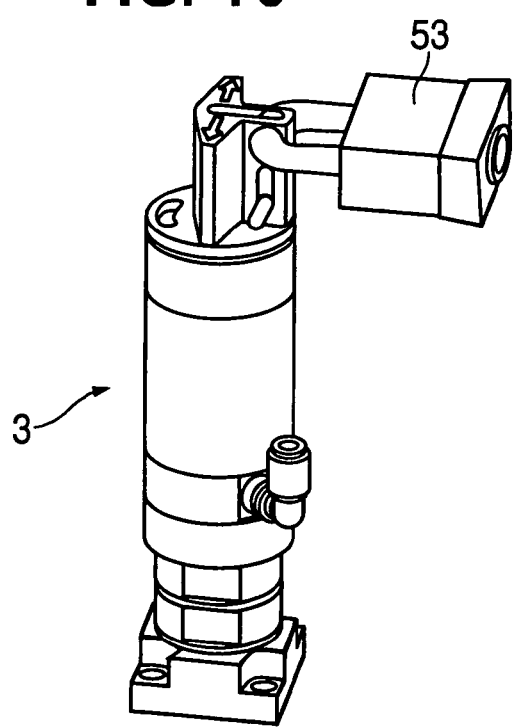
FIG. 10 is a perspective of the valve of FIG. 3 wherein a padlock has been introduced in the exposed hole in the knob.
Figure 11:
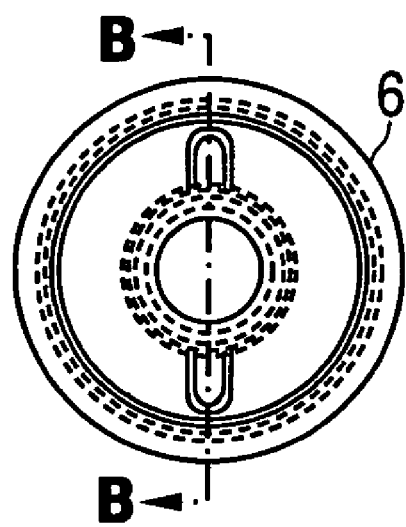
FIG. 11 is an end view of an actuator cap which forms one end of the housing of the pneumatic valve of FIG. 3.
Figure 12:
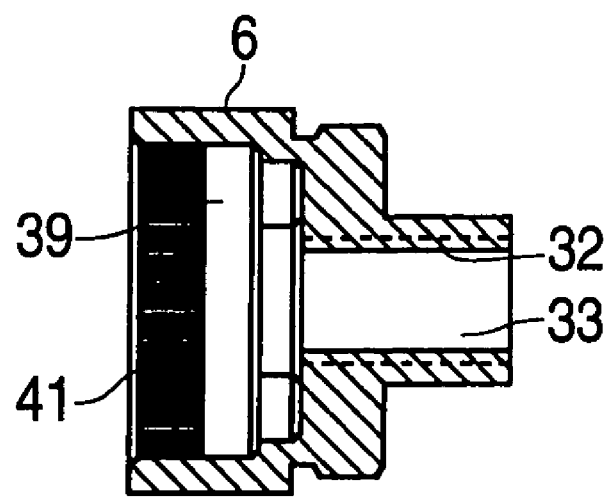
FIG. 12 is a cross sectional view of the actuator cap taken along the line B-B in FIG. 11.

The locking member 46 can now be actuated by manually depressing it to disable the valve. This is accomplished by pushing down on the control pins 48 and 49 on the outer surface of the knob, which engages the lower end of the locking member into the keyed aperture or notch 47 to prevent inadvertent rotation of the knob and stem. Pushing down on the locking member exposes the lockout/tagout hole 52 in the knob to allow the padlock 53 or similar locking device as shown in FIG. 10 to be inserted through the hole. While the knob is in the disabled position, the valve will not open even when pressurized air is applied to the air collar by way of the fitting 19 thus acting as a mechanical override to the described pneumatic operation.

In the case a padlock or other locking device is not inserted in the hole 52 when the locking member is depressed, upon release the locking member will be forced up and away from the housing and the aperture 47 by the spring 54 thereby allowing the knob to be rotated manually from the disabled position to the enabled position. Counter-clockwise rotation of the knob away from the disabled position moves the threaded stem away from the seat and away from the actuator pistons. The valve 11 is no longer locked in the closed position and the actuator pistons are free to move upwardly away from the valve seat when pressurized air is applied to the air collar by way of the fitting. When rotating the knob counter-clockwise with pressurized air applied to the air collar, the stem and actuator pistons move away from the domed diaphragm. The diaphragm becomes unrestrained and moves away from the seat and opens the flow passage 8 through the pneumatic valve. When the tooth 42 of the stop 37 located on the stem contacts the shoulder 44 on the lockout stop 38, the flow path is fully opened as shown in the left side of FIG. 7.

The described combination of features in the improved pneumatic valve with lockout of the present invention enable the valve to be very compact. In the example embodiment, the surface mount body 5 has a square configuration one and one-eighth inches on each side and, as seen in the top views of FIGS. 4 and 5, the entire pneumatic valve with lockout, except for the outer portion of the air fitting 19, is located within this footprint. Because the air fitting can be swiveled about the longitudinal axis A-A of the pneumatic valve, it can be located most conveniently for making connection with the pressurized air supply plumbing and only a single connection is necessary. The lockout hole 52 is also conveniently located at the top of the pneumatic valve when the locking member is depressed. In the disabled position of the valve, the locking member and the lockout hole extend at an angle of 90° to the flow direction through the valve, as indicated by the flow arrow in FIGS. 4 and 5. Thus, a series of such components in a flow control assembly on a manifold can be conveniently locked using a single cable, for example, extending through each of the similarly aligned holes in the valves.

In the example embodiment, the threaded stem and actuator cap are formed of cast stainless steel, the springs are formed of spring steel, the flexible diaphragm is made of stainless steel, the O-rings are formed of a silicone rubber known commercially as Viton, and the remainder of the components of the pneumatic valve are formed of aluminum. Other materials and dimensions from those disclosed herein could of course be used as will be readily apparent to the skilled artisan. Because the air actuator connection of the pneumatic valve is not fixed, a connection can be made from any source around a 360° radial from the axis of the valve. This allows the end user improved flexibility during installation and reduces interference. The dual functionality of the valve, providing air actuation and manual operation, also reduces the need for an additional valve, which commonly was required in most prior art systems.

The invention has been described with reference to the preferred embodiment. Obviously, modifications and alterations will occur to others upon our reading and understanding of the specification. It is intended to include all such modification and alterations insofar as they come within the scope of the appended claims or the equivalence thereof.

I claim:

1. A normally closed pneumatic diaphragm valve with mechanical override with lockout for controlling the flow of a fluid, comprising:
    a housing;
    a fluid flow passage extending through the housing between a fluid inlet and a fluid outlet;
    a diaphragm valve movable along an axis to open and close the flow passage;
    a pneumatic actuator operable to move the diaphragm valve to open and close the flow passage;
    a manual lockout device rotatable around said axis relative to the housing between a position to enable the valve to be opened by the pneumatic actuator and a position to disable the valve in a position closing the flow passage, the device including a locking member selectively movable to a position preventing rotation of the lockout device from the disabled position;
    a fitting on the housing to convey a pressurized gas to and from the pneumatic actuator for respectively pressurizing and venting the actuator independently of the position of the manual lockout device.

2. The pneumatic valve with lockout according to claim 1, wherein said fitting is mounted on the housing for rotation around said axis relative to said housing.

3. The pneumatic valve with lockout according to claim 2, wherein said fitting is mounted on the housing by way of a collar which extends around and is rotatably connected to said housing.

4. The pneumatic valve with lockout according to claim 1, wherein the manual lockout device includes a knob rotatable relative to said housing between said position to enable the valve and said position to disable the valve, and wherein said locking member is mounted in said knob and selectively movable to and from the housing when the knob is in the disabled position to respectively prevent and permit rotation of the knob relative to said housing.

5. The pneumatic valve with lockout according to claim 4, wherein said housing includes an aperture in which an end of said locking member is received to prevent rotation of the knob relative to the housing when the locking member is moved to the housing with the knob in the disabled position.

6. The pneumatic valve with lockout according to claim 4, wherein said knob further includes a hole for a locking device selected from the group consisting of a padlock and a cable, movement of said locking member to the housing exposing said hole to allow the locking device to be inserted through the hole to preclude movement of the locking member from the housing.

7. The pneumatic valve with lockout according to claim 4, further comprising a pair of control pins protruding from the locking member in opposite directions through openings in the knob for manual movement of the locking member.

8. The pneumatic valve with lockout according to claim 4, wherein the manual lockout device further comprises a spring yieldably biasing said locking member for movement from said housing.

9. The pneumatic valve with lockout according to claim 4, wherein the manual lockout device further includes a stem having one end affixed to said knob for rotation therewith and a second, threaded end rotatably engaged in a threaded hole in said actuator for translation to enable and disable the valve.

10. The pneumatic valve with lockout according to claim 1, wherein said diaphragm valve includes a flexible diaphragm movable with respect to a valve seat about the flow passage to open and close the flow passage.

11. A normally closed combination manual/pneumatic diaphragm valve with mechanical override with lockout for fluid control, comprising:
 a housing;
 a fluid flow passage extending through the housing between a fluid inlet and a fluid outlet;
 a diaphragm valve movable along an axis to open and close the flow passage;
 a pneumatic actuator operable to move the diaphragm valve to open and close the flow passage;
 a knob rotatable around said axis relative to the housing between a position to enable the valve to be opened by the pneumatic actuator and a position to disable the valve in a position closing the flow passage;
 a fitting on the housing to convey a pressurized gas to the pneumatic actuator for operating the actuator;
 wherein said fitting is mounted on the housing to allow rotation of the fitting around said axis relative to said housing.

12. The combination manual/pneumatic valve according to claim 11, wherein said fitting is mounted on the housing by way of a collar which extends around and is rotatably connected to said housing.

13. The combination manual/pneumatic valve according to claim 11, further comprising a locking member mounted in said knob and selectively movable to a position to prevent rotation of the knob relative to the housing when the knob is in the position to disable the valve.

14. The combination manual/pneumatic valve according to claim 13, wherein said housing includes an aperture in which an end of said locking member is received to prevent rotation of the knob relative to the housing when the locking member is moved to the housing with the knob in the position to disable the valve.

15. The combination manual/pneumatic valve according to claim 13, wherein said knob further includes a hole for a locking device selected from the group consisting of a padlock and a cable, movement of said locking member to the housing exposing said hole to allow the locking device to be inserted through the hole and preclude movement of the locking member from the housing.

16. The combination manual/pneumatic valve according to claim 13, further comprising a pair of control pins protruding from the locking member in opposite directions through openings in the knob for manual movement of the locking member.

17. The combination manual/pneumatic valve according to claim 13, further comprising a spring yieldably biasing said locking member for movement from said housing.

18. The combination manual/pneumatic valve according to claim 11, further comprising a stem having one end affixed to said knob for rotation therewith and a second, threaded end rotatably engaged in a threaded hole in said actuator for translation to enable and disable the valve.

19. The combination manual/pneumatic valve according to claim 11, wherein said diaphragm valve includes a flexible diaphragm movable with respect to a valve seat about the flow passage to open and close the flow passage.

20. A normally closed combination manual/pneumatic diaphragm valve with mechanical override with lockout for fluid control, comprising:
 a housing;
 a fluid flow passage extending through the housing between a fluid inlet and a fluid outlet;
 a diaphragm valve movable along an axis to open and close the flow passage;
 a pneumatic actuator operable to move the diaphragm valve to open and close the flow passage;
 a fitting on the housing to convey a pressurized gas to the pneumatic actuator for operating the actuator, said fitting being mounted on the housing to swivel around said axis relative to said housing;
 a knob rotatable around said axis relative to the housing between a position to enable the valve to be opened by the pneumatic actuator and a position to disable the valve in a position closing the flow passage, said knob including a locking member mounted in the knob for movement to and from the housing when the knob is in the position to disable the valve to respectively prevent and permit rotation of the knob relative to said housing, and a hole in said knob for a locking device selected from the group consisting of a padlock and a cable, movement of said locking member to the housing exposing said hole to allow the locking device to be inserted through the hole to preclude movement of the locking member from the housing.

21. The combination manual/pneumatic valve according to claim 20, further comprising a pair of control pins protruding from the locking member in opposite directions through openings in the knob for manual movement of the locking member.

22. The combination manual/pneumatic valve according to claim 20, further comprising a spring in said knob yieldably biasing said locking member for movement from said housing.

* * * * *